(12) United States Patent
Mattis et al.

(10) Patent No.: US 10,319,997 B2
(45) Date of Patent: Jun. 11, 2019

(54) COATED ANODE MATERIAL AND METHOD OF PREPARING THE SAME

(71) Applicant: Microvast Power Systems Co., Ltd., Huzhou, Zhejiang Province (CN)

(72) Inventors: Wenjuan Liu Mattis, Stafford, TX (US); Jianhai Luo, Huzhou (CN)

(73) Assignee: MICROVAST POWER SYSTEMS CO., LTD., Huzhou, Zhejiang Province (CN)

( * ) Notice: Subject to any disclaimer, the term of this patent is extended or adjusted under 35 U.S.C. 154(b) by 32 days.

(21) Appl. No.: 15/207,790

(22) Filed: Jul. 12, 2016

(65) Prior Publication Data

US 2017/0092946 A1   Mar. 30, 2017

(30) Foreign Application Priority Data

Sep. 25, 2015 (CN) .......................... 2015 1 0621549

(51) Int. Cl.
*H01M 10/0525* (2010.01)
*H01M 10/0585* (2010.01)
(Continued)

(52) U.S. Cl.
CPC .......... *H01M 4/386* (2013.01); *C01B 33/021* (2013.01); *H01M 4/0402* (2013.01); *H01M 4/0404* (2013.01); *H01M 4/134* (2013.01); *H01M 4/1395* (2013.01); *H01M 4/58* (2013.01); *H01M 4/62* (2013.01); *H01M 4/623* (2013.01); *H01M 4/625* (2013.01); *H01M 10/0525* (2013.01); *H01M 10/0585* (2013.01); *H01M 4/366* (2013.01); *H01M 10/052* (2013.01);
(Continued)

(58) Field of Classification Search
CPC ...... H01M 4/386; H01M 4/625; H01M 4/434; H01M 4/0402; H01M 4/1395; H01M 10/0525; H01M 2004/027; H01M 4/134
See application file for complete search history.

(56) References Cited

U.S. PATENT DOCUMENTS

| | | | |
|---|---|---|---|
| 2005/0268956 A1* | 12/2005 | Take | B22F 1/025 136/208 |
| 2009/0029256 A1* | 1/2009 | Mah | H01B 1/24 429/231.8 |
| 2010/0285358 A1* | 11/2010 | Cui | H01M 4/134 429/218.1 |

FOREIGN PATENT DOCUMENTS

| | | |
|---|---|---|
| CN | 1893154 A | 1/2007 |
| CN | 101609891 A | 12/2009 |
| CN | 102460782 A | 5/2012 |

OTHER PUBLICATIONS

Li et al., "SiC nanowire networks," 2003, Journal of Alloys and Compounds, 352, 279-282 (Year: 2003).*

* cited by examiner

*Primary Examiner* — Ula C Ruddock
*Assistant Examiner* — Matthew W Van Oudenaren
(74) *Attorney, Agent, or Firm* — Cheng-Ju Chiang

(57) ABSTRACT

The present application provides a coated anode material and a method of preparing the same. The coated anode material has a core-shell structure, wherein the core-shell structure includes an inert core and a shell coated on the inert core, the shell comprises an anode active material, and the inert core comprises a non-active material. In the coated anode material, the anode active material of the shell is distributed over the non-active material of the inert core, and the coated anode material can overcome the volume change problem of silicon particles during lithium insertion/dein- (Continued)

sertion to a certain extent and obtain a better cycle performance and rate performance.

4 Claims, 4 Drawing Sheets

(51) Int. Cl.
    *H01M 4/38*     (2006.01)
    *H01M 4/04*     (2006.01)
    *H01M 4/134*     (2010.01)
    *H01M 4/1395*     (2010.01)
    *H01M 4/36*     (2006.01)
    *H01M 4/58*     (2010.01)
    *H01M 4/62*     (2006.01)
    *C01B 33/021*     (2006.01)
    *H01M 4/02*     (2006.01)
    *H01M 10/052*     (2010.01)

(52) U.S. Cl.
    CPC ................ *H01M 2004/021* (2013.01); *H01M 2004/027* (2013.01); *H01M 2220/20* (2013.01); *H01M 2220/30* (2013.01)

COATED ANODE MATERIAL AND METHOD OF PREPARING THE SAME

CROSS REFERENCE TO RELATED APPLICATION

The present application is based on and claims priority of Chinese patent application No. 201510621549.7, filed on Sep. 25, 2015. The entire disclosure of the above-identified application, including the specification, drawings and claims are incorporated herein by reference in its entirety.

FIELD OF THE INVENTION

The present application relates to an anode material for a lithium ion battery and a method of preparing the same, and more particularly to a coated anode material for a lithium ion battery and a method of preparing the same.

BACKGROUND OF THE INVENTION

Lithium ion batteries (hereinafter referred as "LIB") are widely used in various kinds of electric appliances, and also used as power energy of electric vehicles, due to the LIB having advantages of higher operating voltage, higher energy density, stable discharge potential, low self discharge, long cycle life, no memory effect and no pollution.

When LIB is used as power energy of electric vehicles, the requirement of power energy for LIB is much higher than portable electric appliances. In addition to improve cathode material, electrolyte and separator, the improvement of anode material is also important. Selection of an anode active material is a key factor that affects the performance of LIB. The anode active material used in existing commercial LIBs is mainly graphite, which has a low insertion potential and an excellent lithium insertion/deinsertion performance. Thus, the graphite is a good anode active material for LIB. The capacity of insertion/deinsertion of lithium ions in graphite can be carried out according to chemometry of $LiC_6$, the theoretical capacity of graphite is reached to 372 mAh/g, but the practical capacity of graphite is generally 330 mAh/g, which is quite close to its theoretical capacity. Thus, it is difficult to further improve the capacity of graphite.

The low capacity of carbon-based anode active material (e.g., graphite) restricts the energy density of LIB. Therefore, some non-carbon anode active materials have attracted attention by the industry because of higher energy density. Among them, silicon is a potential anode active material for the upgrading of graphite, wherein the nominal capacity of silicon can be reached to 4200 mAh/g, which is much higher than graphite. Also, the voltage plateau of silicon is higher than graphite, therefore it is not easy to arise lithium plating during charging and with better safety performance as well. However, the cycle performance of silicon is not good enough, and the volume change of silicon during lithium insertion/deinsertion is huge and can be reached to 300%. The volume change effect may separate the anode active material from the current collector. Also, silicon by itself is prone to chalking, resulting in a decline in battery performance. In addition, silicon is a semiconductor material, its conductivity is low.

In order to overcome the disadvantages of silicon-based anode active material, a lot of works have been done by researches on silicon. For example, the silicon material is processed to nanoparticles silicon, porous silicon, or coated silicon, wherein coating examples typically include coating carbon on silicon or coating inert material on silicon. When the silicon is coated to form a composite material, silicon is the main part of the composite material, the outer layer coated on the silicon can be used to buffer volume expansion and increase electron transport ability. By coating a layer of carbon on outer surfaces of silicon nanoparticles, a silicon carbon composite material having a core shell structure is obtained. If the size of silicon particles is at nanoscale, the volume change effect is small, and the existence of a layer of carbon on the silicon will decrease direct contact between the silicon particles and the electrolyte and improve electron transport capability among the silicon particles, to enhance cycling stability of the whole anode electrode.

Chinese patent application No. 200510119964.9 discloses a silicon composite consisting of silicon particles whose surface is at least partially coated with a layer of silicon carbide. The size of the silicon particles is in the range of 50 nm to 50 μm, and an outer surface of the silicon particles is sintered at least partially to form a layer of silicon carbide. By means of coating the silicon particles with a layer of the silicon carbide, the initial efficiency and the cycling stability are improved, the volume change during charging and discharging is reduced, making the silicon composite more suitable for LIB anode active material.

Currently, silicon coating is mainly realized by coating a layer of inert material or carbon material on outer surfaces of silicon particles. The outer coating layer can control the volume change effect of silicon during charging and discharging. Thus, the problems of great volume change during charging and discharging and easily being chalking can be solved, to a certain extent, by coating the silicon particles. However, because silicon as an anode active material is coated and covered by carbon material or inert material, lithium ions have to pass through the outer coating layer firstly and then embed into the anode active material (i.e., the silicon) in the process of lithium insertion. Therefore, the outer coating layer outside the silicon will affect the rate capability of the anode material.

SUMMARY OF THE INVENTION

In one aspect, the present application provides a coated anode material having a core-shell structure. The core-shell structure includes an inert core and a shell coated on the inert core. The shell includes an anode active material, and the inert core includes a non-active material. In the present application, the non-active material of the inert core has a specific capacity of less than 50 mAh/g. Preferably, the anode active material of the shell has a specific capacity of more than 500 mAh/g; more preferably, the anode active material of the shell has a specific capacity of more than 800 mAh/g.

In an embodiment of the present application, the non-active material of the inert core is at least one selected from the group consisting of silicon carbide, tungsten carbide, titanium carbide, boron carbide, chromium carbide, silicon nitride, aluminium nitride, titanium nitride, zirconium nitride, chromium nitride, barium titanate, aluminium fluoride, titanium boride, copper powder, barium sulfate, and calcium carbonate.

In an embodiment of the present application, the anode active material of the shell is silicon, and the non-active material of the inert core is silicon carbide.

Silicon carbide is a covalent bonding compound with a crystal lattice tightly bonded together. Crystalline silicon carbide is exclusive to lithium ions, and basically there is no lithium intercalation to silicon carbide. Therefore, silicon carbide cannot be used as anode active material alone. Silicon carbide has the advantages of high strength, high flexibility, good resistance to temperature, and no chalking. The silicon carbide can be used as anode active material when the silicon carbide is made into nanowires, in which case the silicon carbide will have a larger specific surface area with many silicon atoms exposed on the outer surfaces of the nanowires, such that lithium ions can be embedded between the nanowires of the silicon carbide to obtain a higher lithium intercalation capacity, which can be reached to 876 mAh/g. In the present application, the silicon carbide used in constituting the inert core has a covalent bonding structure, with no or very low lithium insertion/deinsertion ability, and it can not be used alone as anode active material.

In an embodiment of the present application, the inert core has an average particle size of 5 nm~200 nm; preferably, the average particle size of the inert core is in the range of 10 nm~100 nm; more preferably, the average particle size of the inert core is in the range of 20 nm~40 nm.

In an embodiment of the present application, the shell has a thickness of 2 nm~50 nm; preferably, the thickness of the shell is in the range of 3 nm~10 nm.

In another aspect, the present application provides a method of preparing the coated anode material, the method comprising the following steps:

(a) dissolving naphthaline and sodium in an organic solvent, dispersing a non-active material in the organic solvent, and adding a silicon-containing compound into the organic solvent for reaction;

(b) washing and drying the product obtained from step (a), and then heat treating the product in an atmosphere of inert gas.

As for step (a), in a first embodiment, the naphthaline is firstly dissolved in the organic solvent, then the non-active material is added and dispersed in the organic solvent, then the sodium is added and dissolved in the organic solvent, and then the silicon-containing compound is added into the organic solvent for reaction.

As for step (a), in a second embodiment, a sodium naphthaline solution is firstly prepared by dissolving the naphthaline and the sodium in the organic solvent, then the non-active material is added and dispersed in the sodium naphthaline solution, and then the silicon-containing compound is added into the sodium naphthaline solution for reaction.

As for step (a), in a third embodiment, the silicon-containing compound and the non-active material are dispersed in the organic solvent, a sodium naphthaline solution is prepared by dissolving naphthaline and sodium in a solvent, and the sodium naphthaline solution is then dropped into the organic solvent which is dispersed with the silicon-containing compound and the non-active material.

In an embodiment of the present application, the organic solvent is at least one selected from the group consisting of ethylene glycol dimethyl ether, tetrahydrofuran, diethyl ether, 1,4-dioxane, benzol, methylbenzene, dimethylbenzene, ethyl acetate, n-hexane, cyclohexane, and carbonic ester.

In an embodiment of the present application, the non-active material is at least one selected from the group consisting of silicon carbide, tungsten carbide, titanium carbide, boron carbide, chromium carbide, silicon nitride, aluminium nitride, titanium nitride, zirconium nitride, chromium nitride, barium titanate, aluminium fluoride, titanium boride, copper powder, barium sulfate, and calcium carbonate.

In an embodiment of the present application, the silicon-containing compound is silicon tetrachloride.

In an embodiment of the present application, the inert gas is at least one selected from the group consisting of nitrogen, hydrogen, argon, and helium.

In an embodiment of the present application, the heat treatment is preformed at a temperature between 200° C. and 1000° C. for a period between 1 h and 20 h; preferably, the heat treatment is performed at a temperature between 300° C. and 700° C. for a period between 2 h and 10 h.

In an embodiment, the method of preparing the coated anode material comprises the following step:

(a) dissolving naphthaline in an organic solvent of ethylene glycol dimethyl ether, adding and dispersing silicon carbide in the organic solvent, adding and dissolving sodium in the organic solvent, and then adding silicon tetrachloride into the organic solvent for reaction;

(b) washing and drying the product obtained from step (a), and then heat heating the product at a temperature between 600° C. and 800° C. for a period between 2 h and 5 h in an atmosphere of argon.

In a further aspect, the present application provides a lithium ion battery (LIB) which comprises the above coated anode material.

Usually, traditional coated anode material is a composite anode material, which has a core-shell structure with an anode active material (e.g., silicon) as the core and a carbon material or an inert material as the shell coated on the outer surface of the core. However, the present application is different from the traditional coating method. In the present application, the active material of silicon is coated on an inert core which has the advantages of high strength, high flexibility, good tolerance to temperature, and no chalking. The coated anode material of the present application can overcome the volume change of silicon particles during charging and discharging to a certain extent and obtain a better cycle performance and rate performance. On the other hand, since the active material of silicon is distributed over the outer surface of the coated anode material, the lithium ions do not have to pass through any coating layer in the process of lithium insertion/deinsertion, so that the rate capability of the anode active material is not affected.

DETAILED DESCRIPTION OF PREFERRED EMBODIMENTS

The present application will now be described more specifically with reference to the following embodiments. It is to be noted that the following descriptions of preferred embodiments of this application are presented herein for purpose of illustration and description only. It is not intended to be exhaustive or to be limited to the precise form disclosed.

Embodiment 1

Figure 1:
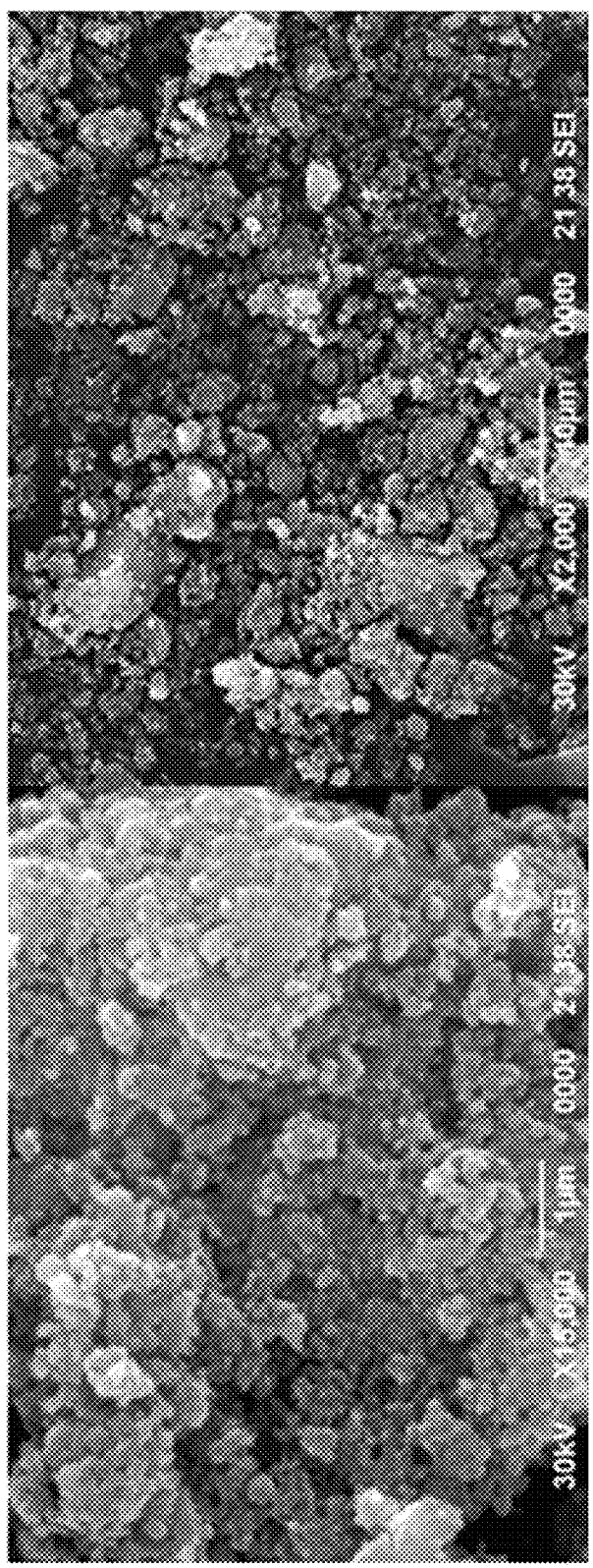
FIG. 1 shows a SEM photograph of a coated anode material prepared in embodiment 1.
Figure 2:
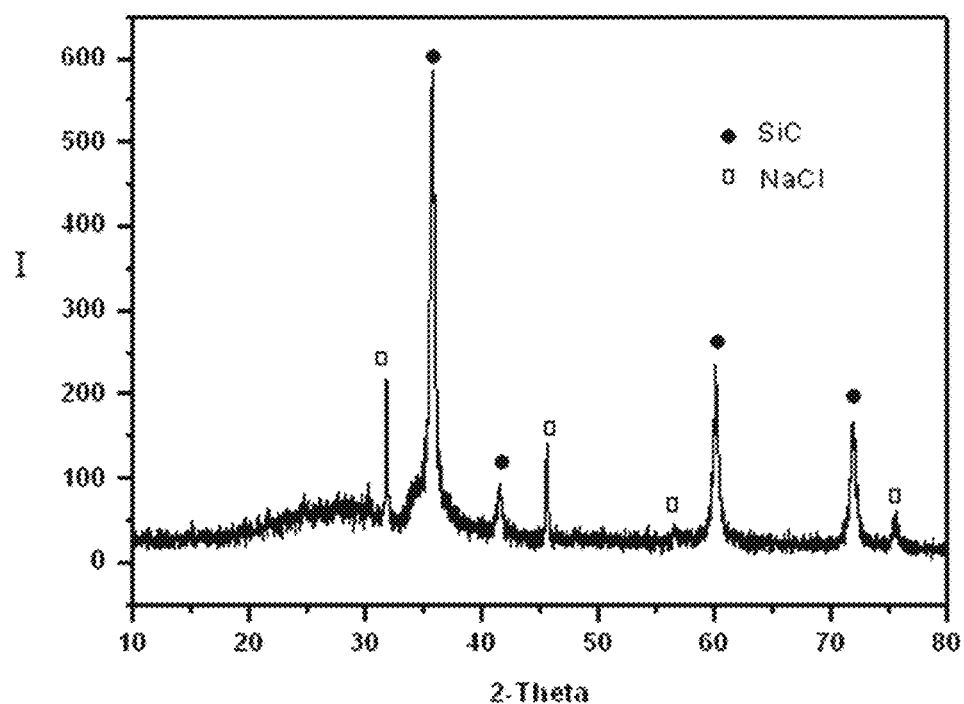
FIG. 2 shows an XRD pattern of a coated anode material prepared in embodiment 1.

Preparing coated anode material: referring to FIGS. 1-2, dissolving 38.4 g naphthaline in 200 ml ethylene glycol dimethyl ether, adding and dispersing 2.0 g silicon carbide (SiC) by ultrasonic dispersion method for 1 h, adding 8.36 g sodium and stirring overnight until the sodium is dissolved to form a dark green solution. Then, adding 12.18 g silicon tetrachloride for reaction and stirring for 2 h. Thereafter, filtering the obtained product, washing it three times by cyclohexane, and drying it. Then, heat treating the product for 3 h under an atmosphere of argon at a temperature of 600° C. As a result, a coated anode material with a core-shell structure is prepared. The core-shell structure includes an inert core and a shell coated on the inert core, wherein the inert core includes a non-active material of silicon carbide (SiC), and the shell includes an anode active material of silicon.

Preparing coin cell: providing 0.1 g the coated anode material as prepared above, 0.1 g conductive carbon black, and 3.333 g PVDF solution (in the NMP solvent, PVDF accounts for 3% by weight), then mixing them for 10 min, thereafter coating the anode material on current collector at a thickness of 125 um, forced air drying, cutting piece, and vacuum drying. As a result, a coil cell is prepared.

Embodiment 2

Figure 4:
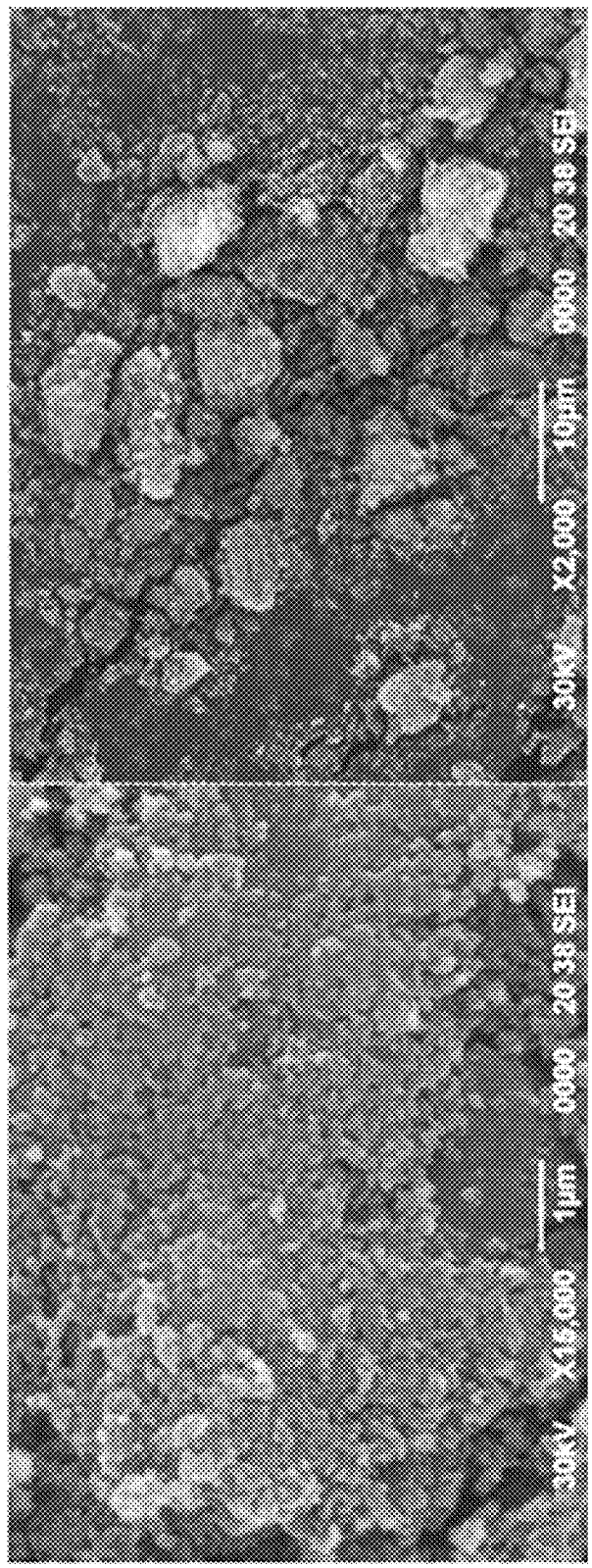
FIG. 4 shows a SEM photograph of a coated anode material prepared in embodiment 2.

Preparing coated anode material: referring to FIG. 4, dissolving 38.4 g naphthaline in 200 ml ethylene glycol dimethyl ether, adding and dispersing 4.0 g silicon carbide (SiC) by ultrasonic dispersion method for 1 h, adding 8.36 g sodium and stirring overnight until the sodium is dissolved to form a dark green solution. Then, adding 12.18 g silicon tetrachloride for reaction and stirring for 2 h. Thereafter, filtering the obtained product, washing it three times by cyclohexane, and drying it. Then, heat treating the product for 3 h under an atmosphere of argon at a temperature of 600° C. As a result, a coated anode material with a core-shell structure is formed. The core-shell structure includes an inert core and a shell coated on the inert core, wherein the inert core includes a non-active material of silicon carbide (SiC), and the shell includes an anode active material of silicon.

Preparing coin cell: same as embodiment 1.

TABLE 1

|  | Coating thickness(nm) | Initial discharging capacity(mAh/g) | Mid-voltage(V) |
| --- | --- | --- | --- |
| embodiment 1 | 6.65 | 488 | 0.38 |
| embodiment 2 | 3.79 | 204 | 0.37 |

Figure 3:
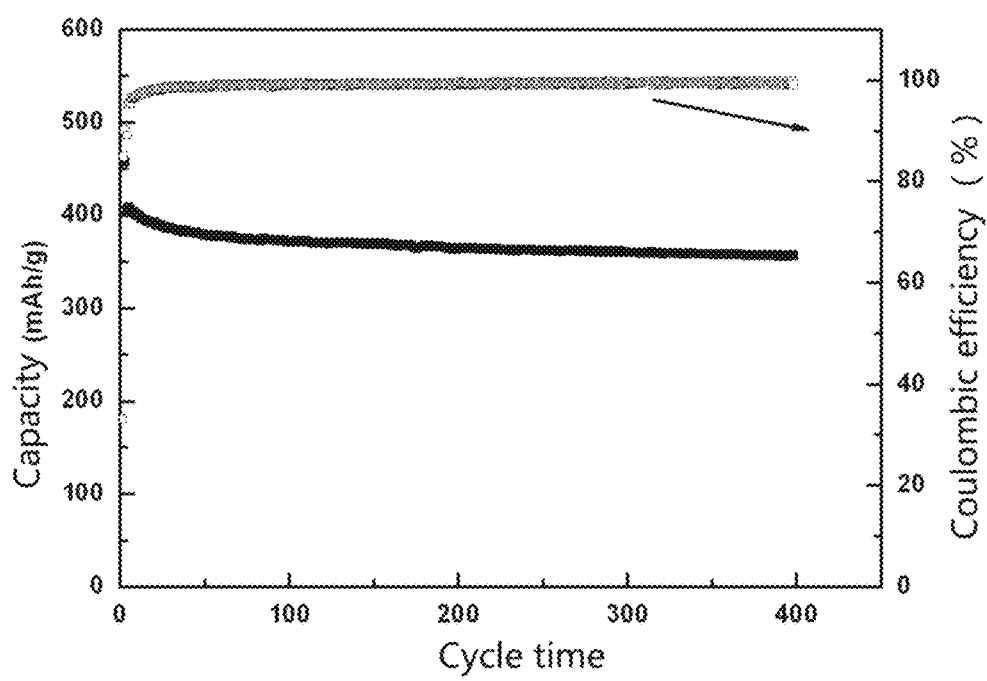
FIG. 3 is a graph showing the performance test result of a coin cell prepared in embodiment 1.
Figure 5:
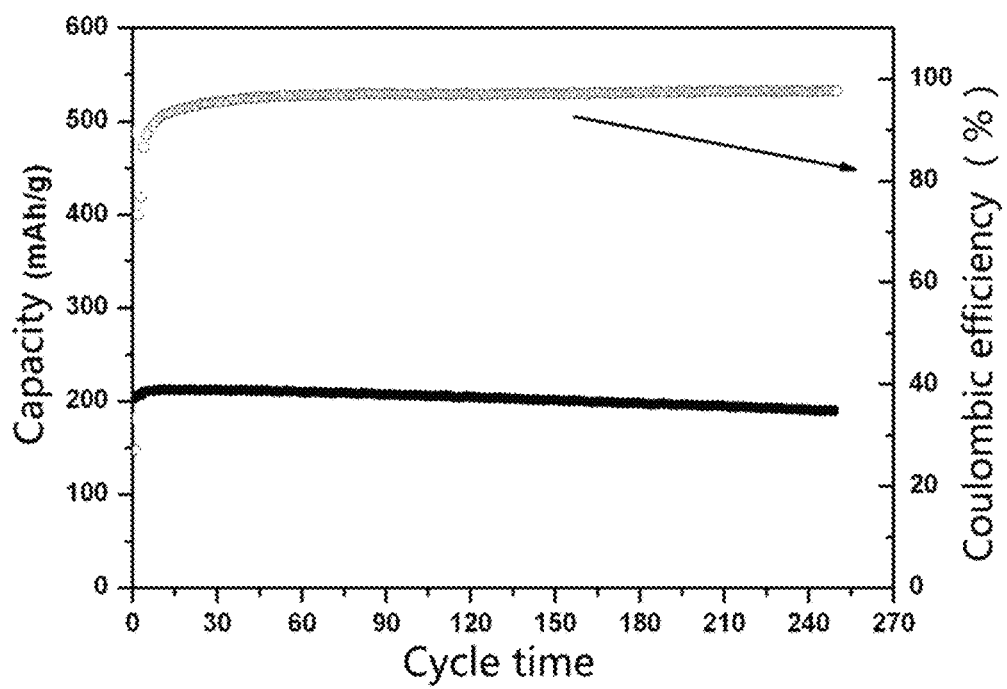
FIG. 5 is a graph showing the performance test result of a coin cell prepared in embodiment 2.

The test results of embodiment 1 and embodiment 2 are shown in table 1. As shown from table 1 and FIG. 3 and FIG. 5, the coated anode materials obtained by coating a layer of silicon on an outer surface of silicon carbide (SiC) have a good cycle performance. In the embodiment 1, the coating thickness of the silicon is 6.65 nm, the specific capacity is stable at 380 mAh/g under the rate of 2C. In the embodiment 2, the coating thickness of silicon is 3.79 nm, the specific capacity is stable at 200 mAh/g under the rate of 3C.

Embodiment 3

Preparing coated anode material: dissolving 38.4 g naphthaline in 200 ml tetrahydrofuran, adding and dispersing 2.0 g silicon carbide (SiC) by ultrasonic dispersion method for 1 h, adding 8.36 g sodium and stirring overnight until the sodium is dissolved to form a dark green solution. Then, adding 12.18 g silicon tetrachloride for reaction and stirring for 2 h. Thereafter, filtering the obtained product, washing it three times by cyclohexane, and drying it. Then, heat treating the product for 10 h under an atmosphere of nitrogen at a temperature of 300° C. As a result, a coated anode material with a core-shell structure is formed. The core-shell structure includes an inert core and a shell coated on the inert core, wherein the inert core includes a non-active material of silicon carbide (SiC), and the shell includes an anode active material of silicon.

Embodiment 4

Preparing coated anode material: dissolving 38.4 g naphthaline in 200 ml tetrahydrofuran, adding and dispersing 2.0 g silicon nitride ($Si_3N_4$) by ultrasonic dispersion method for 1 h, adding 8.36 g sodium and stirring overnight until the sodium is dissolved to form a dark green solution. Then, adding 12.18 g silicon tetrachloride for reaction and stirring for 2 h. Thereafter, filtering the obtained product, washing it three times by cyclohexane, and drying it. Then, heat treating the product for 1 h under an atmosphere of nitrogen at a temperature of 800° C. As a result, a coated anode material with a core-shell structure is formed. The core-shell structure includes an inert core and a shell coated on the inert core, wherein the inert core includes a non-active material of silicon nitride ($Si_3N_4$), and the shell includes an anode active material of silicon.

What is claimed is:

1. A coated anode material having a core-shell structure, wherein the core-shell structure includes an inert core being in the form of a particle and a shell coated on the inert core, the inert core has an average particle size of approximately 5 nm to approximately 200 nm, the shell has a thickness of approximately 2 nm to approximately 50 nm, the shell comprises an anode active material having a specific capacity of more than 500 mAh/g, and the inert core comprises a non-active material having a specific capacity of less than 50 mAh/g, wherein the anode active material of the shell is silicon, and the non-active material of the inert core is silicon carbide or silicon nitride.

2. The coated anode material of claim 1, wherein the average particle size of the inert core is in the range of approximately 10 nm to approximately 100 nm.

3. The coated anode material of claim 1, wherein the thickness of the shell is in the range of approximately 3 nm to approximately 10 nm.

4. A lithium ion battery comprising the coated anode material of claim 1.

* * * * *